(12) United States Patent
Katsuki

(10) Patent No.: US 11,192,560 B1
(45) Date of Patent: Dec. 7, 2021

(54) FAIR ANOMALY DETECTION AND LOCALIZATION

(71) Applicant: International Business Machines Corporation, Armonk, NY (US)

(72) Inventor: Takayuki Katsuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/940,853

(22) Filed: Jul. 28, 2020

(51) Int. Cl.
| | |
|---|---|
| *G08B 23/00* | (2006.01) |
| *B60W 40/09* | (2012.01) |
| *G05B 23/02* | (2006.01) |
| *B60K 28/06* | (2006.01) |
| *G08G 1/16* | (2006.01) |

(52) U.S. Cl.
CPC ........... *B60W 40/09* (2013.01); *B60K 28/066* (2013.01); *G05B 23/0227* (2013.01); *G08G 1/166* (2013.01)

(58) Field of Classification Search
CPC . B60W 40/09; B60K 28/066; G05B 23/0227; G08G 1/166
USPC ....................................................... 340/576
See application file for complete search history.

(56) References Cited

U.S. PATENT DOCUMENTS

| | | | | |
|---|---|---|---|---|
| 9,586,599 | B2* | 3/2017 | Filev | B60W 50/16 |
| 9,714,037 | B2* | 7/2017 | DeRuyck | B60W 40/09 |
| 10,979,442 | B2* | 4/2021 | Yamanashi | G07C 5/008 |
| 11,115,300 | B2* | 9/2021 | Nazar | H04L 43/0823 |
| 2015/0120336 | A1* | 4/2015 | Grokop | G06Q 40/08 705/4 |
| 2017/0109509 | A1* | 4/2017 | Baghdasaryan | G06F 21/32 |
| 2019/0081871 | A1* | 3/2019 | Nazar | H04L 43/0823 |

(Continued)

FOREIGN PATENT DOCUMENTS

CN 110334592 A 10/2019

OTHER PUBLICATIONS

Anonymous, "System for assessing next worst driving consequences based on real time analysis of human behavior to alert/prevent potential emergency situation", An IP.com Prior Art Database Technical Disclosure, IP.com No. IPCOM000254255D, IP.com Electronic Publication Date: Jun. 14, 2018, 6 pages.

(Continued)

*Primary Examiner* — Zhen Y Wu
(74) *Attorney, Agent, or Firm* — Stosch Sabo

(57) ABSTRACT

Described are techniques for fair anomaly detection. The techniques include generating an anomaly detection model based on a Gaussian distribution of historical data, a mean vector of the Gaussian distribution, and a precision matrix of the Gaussian distribution. The mean vector and the precision matrix can be generated by reducing a function below a threshold, where the function can include the Gaussian distribution, a first regularization term configured to generate similar anomaly scores for inputs with similar fair features and independent of unfair features, and a second regularization term configured to generate similar anomaly localization scores for the inputs with the similar fair features and independent of the unfair features. The techniques further include inputting a new data to the anomaly detection model and generating an anomaly score and an anomaly localization score associated with the new data based on the Gaussian distribution, the mean vector, and the precision matrix.

25 Claims, 8 Drawing Sheets

(56) References Cited

U.S. PATENT DOCUMENTS

| | | | | |
|---|---|---|---|---|
| 2020/0079387 A1* | 3/2020 | A G | ...................... | B60W 40/09 |
| 2020/0364579 A1* | 11/2020 | Misu | ..................... | G06N 3/0454 |
| 2020/0379454 A1* | 12/2020 | Trinh | ................... | G06N 3/0454 |
| 2021/0082292 A1* | 3/2021 | Sindhwani | ............ | G06F 11/079 |

OTHER PUBLICATIONS

Jin et al., "Driver Sleepiness Detection System Based on Eye Movements Variables", Advances in Mechanical Engineering, vol. 2013, Article ID 648431, Nov. 28, 2013, 7 pages.

Hu et al., "Abnormal Driving Detection Based on Normalized Driving Behavior", Jan. 27, 2017, 9 pages.

Mell et al., "The NIST Definition of Cloud Computing", Recommendations of the National Institute of Standards and Technology, Sep. 2011, 7 pages.

\* cited by examiner

| | AUC AD (larger is better) | AUC AL (larger is better) | EO AD (smaller is better) | EO AL (smaller is better) |
|---|---|---|---|---|
| Baseline without our regularizations | 0.58 | 0.65 | 0.9 | 21 |
| Regularized equalized odds (anomaly detection) | 0.58 | 0.65 | 0.010 (1/100 compared to baseline) | 0.24 |
| Regularized equalized odds (anomaly localization) | 0.65 | 0.79 | 0.00066 (almost zero) | 0.031 (1/700 compared to baseline) |
| Both regularizations | 0.66 | 0.79 | 0.00070 (almost zero) | 0.021 (reduced 30% than above) |

FIG. 5

FAIR ANOMALY DETECTION AND LOCALIZATION

BACKGROUND

The present disclosure relates to anomaly detection, and, more specifically, to fair anomaly detection and localization.

Anomaly detection and localization are important aspects of data analysis. Anomaly detection can identify the occurrence of an anomaly, and anomaly localization can identify the anomalous feature, cause, or source of a detected anomaly. In other words, anomaly detection indicates that an unusual or unexpected event occurred, whereas anomaly localization indicates where and/or why the unusual or unexpected event occurred.

One challenge in the field of anomaly detection and localization relates to fairness. In other words, anomalies should not be identified based on unfair features in the data. For example, in the case of a drive recorder of a vehicle, anomaly detection can be used to detect dangerous driving resulting from driver behavior, driver fatigue, vehicle failure, and so on. Meanwhile, anomaly localization can identify the root cause of the detected anomaly. Such data can be utilized by automotive manufacturers, automotive insurance companies, automotive parts suppliers, civil engineers, and the like to improve safety, reliability, and efficiency of vehicles, roads, and drivers. Continuing the above example, for a detected anomaly in a drive recorder, the anomaly localization can indicate that a pattern of braking by the driver was anomalous compared to ordinary braking patterns. However, some features used in anomaly detection and localization can be unfair. Continuing the above example of the drive recorder, it would be unfair to infer anomalous (e.g., dangerous) driving behavior from features unrelated to driver operations such as vertical acceleration (e.g., due to route terrain or road surface characteristics), temperature, probability of inclement weather, driver age, car model, and so on. However, entirely ignoring these "unfair" features can degrade performance of anomaly detection and localization systems. Accordingly, there is a need for techniques and systems capable of reducing the influence of unfair features on anomaly detection and localization models while maintaining acceptable accuracy of the anomaly detection and localization models.

SUMMARY

Aspects of the present disclosure are directed toward a system comprising a vehicle, a plurality of sensors collecting observed vehicle data, a drive recorder configured to aggregate and store the observed vehicle data, and an anomaly detection system communicatively coupled to the drive recorder. The anomaly detection system includes a probability distribution of historical vehicle data, where parameters of the probability distribution are tuned to reduce a function below a threshold. The function is based on the probability distribution conditioned on the historical vehicle data and at least one regularization term configured to generate similar outputs of the probability distribution for inputs having similar fair features and independent of unfair features. The anomaly detection system further includes an anomaly score and an anomaly localization score based on the probability distribution, the parameters, and observed vehicle data.

The aforementioned embodiments realize numerous advantages. First, these embodiments realize improved fairness in anomaly detection insofar as the anomaly score and the anomaly localization score are based on fair (rather than unfair) features as corrected using the at least one regularization term. Second, the aforementioned improvements in fairness are not to the detriment of performance. In fact, usage of the at least one regularization term is shown to maintain or improve performance while also improving fairness (see experimental results discussed with respect to FIG. 6). Third, the additional computational complexity introduced by the at least one regularization term is nonexistent (e.g., with a regularization term related to the anomaly score) or acceptably small (e.g., with a regularization term related to the anomaly localization score).

Further aspects of the present disclosure are directed toward a method comprising training an anomaly detection system configured to generate an anomaly score and an anomaly localization score for vehicle data. The anomaly detection system can be trained to generate similar anomaly scores and anomaly localization scores for historical vehicle data with similar fair features and dissimilar unfair features using a first regularization term and a second regularization term. The method further comprises receiving, at the anomaly detection system and from a drive recorder collecting data from a plurality of sensors on a vehicle, new vehicle data and generating a first anomaly score and a first anomaly localization score associated with the new vehicle data. The method further comprises performing a mitigation action based on the first anomaly score and the first anomaly localization score, wherein the mitigation action alters the vehicle.

The aforementioned embodiments realize numerous advantages. First, these embodiments realize improved fairness in anomaly detection insofar as the anomaly score and the anomaly localization score are based on fair (rather than unfair) features as corrected using the first regularization term and the second regularization term. Second, the aforementioned improvements in fairness are not to the detriment of performance. In fact, the usage of the first and second regularization terms is shown to maintain or improve performance while also improving fairness (see experimental results discussed with respect to FIG. 6). Third, the additional computational complexity introduced by the first regularization term is nonexistent while the additional computational complexity introduced by the second regularization term is acceptably small.

Further aspects of the present disclosure are directed toward a method comprising generating an anomaly detection model based on a Gaussian distribution of historical data, a mean vector of the Gaussian distribution, and a precision matrix of the Gaussian distribution, wherein the mean vector and the precision matrix are generated by reducing a function below a threshold, wherein the function includes the Gaussian distribution, a first regularization term configured to generate similar anomaly scores for inputs with similar fair features and independent of unfair features, and a second regularization term configured to generate similar anomaly localization scores for the inputs with the similar fair features and independent of the unfair features. The method further comprises inputting a new data to the anomaly detection model. The method further comprises generating an anomaly score and an anomaly localization score associated with the new data based on the Gaussian distribution, the mean vector, and the precision matrix.

The aforementioned embodiments realize numerous advantages. First, these embodiments realize improved fairness in anomaly detection insofar as the anomaly score and the anomaly localization score are based on fair (rather than unfair) features as corrected using the first regularization term and the second regularization term. Second, the aforementioned improvements in fairness are not to the detriment of performance. In fact, the usage of the first and second regularization terms is shown to maintain or improve performance while also improving fairness (see experimental results discussed with respect to FIG. 6). Third, the additional computational complexity introduced by the first regularization term is nonexistent while the additional computational complexity introduced by the second regularization term is acceptably small.

Another aspect of the present disclosure according to the aforementioned method further includes the function being reduced using Stochastic Gradient Descent (SGD) or Block Coordinate Gradient Descent. Advantageously, using SGD or Block Coordinate Gradient Descent reduces the computational burden associated with reducing the function below a threshold.

Another aspect of the present disclosure according to the aforementioned method further includes the anomaly score being a negative log likelihood of the new data according to the Gaussian distribution of the historical data, the mean vector, and the precision matrix. Advantageously, the anomaly score can be computationally inexpensive to compute when based on the Gaussian distribution and the precision matrix insofar as the majority of the computational burden exists in the training phase associated with learning the precision matrix. Said another way, the anomaly score can be quickly calculated with low processing overhead according to these embodiments.

Another aspect of the present disclosure according to the aforementioned method further includes the anomaly localization score being a negative log conditional likelihood of a feature of the new data conditioned on other features of the new data according to the Gaussian distribution of the historical data, the mean vector, and the precision matrix. Advantageously, the anomaly localization score can be computationally inexpensive to compute when based on the Gaussian distribution and the precision matrix insofar as the majority of the computational burden exists in the training phase associated with learning the precision matrix. Said another way, the anomaly localization score can be quickly calculated with low processing overhead according to these embodiments.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 5 illustrates a table of experimental results, in accordance with some embodiments of the present disclosure.

Figure 1:
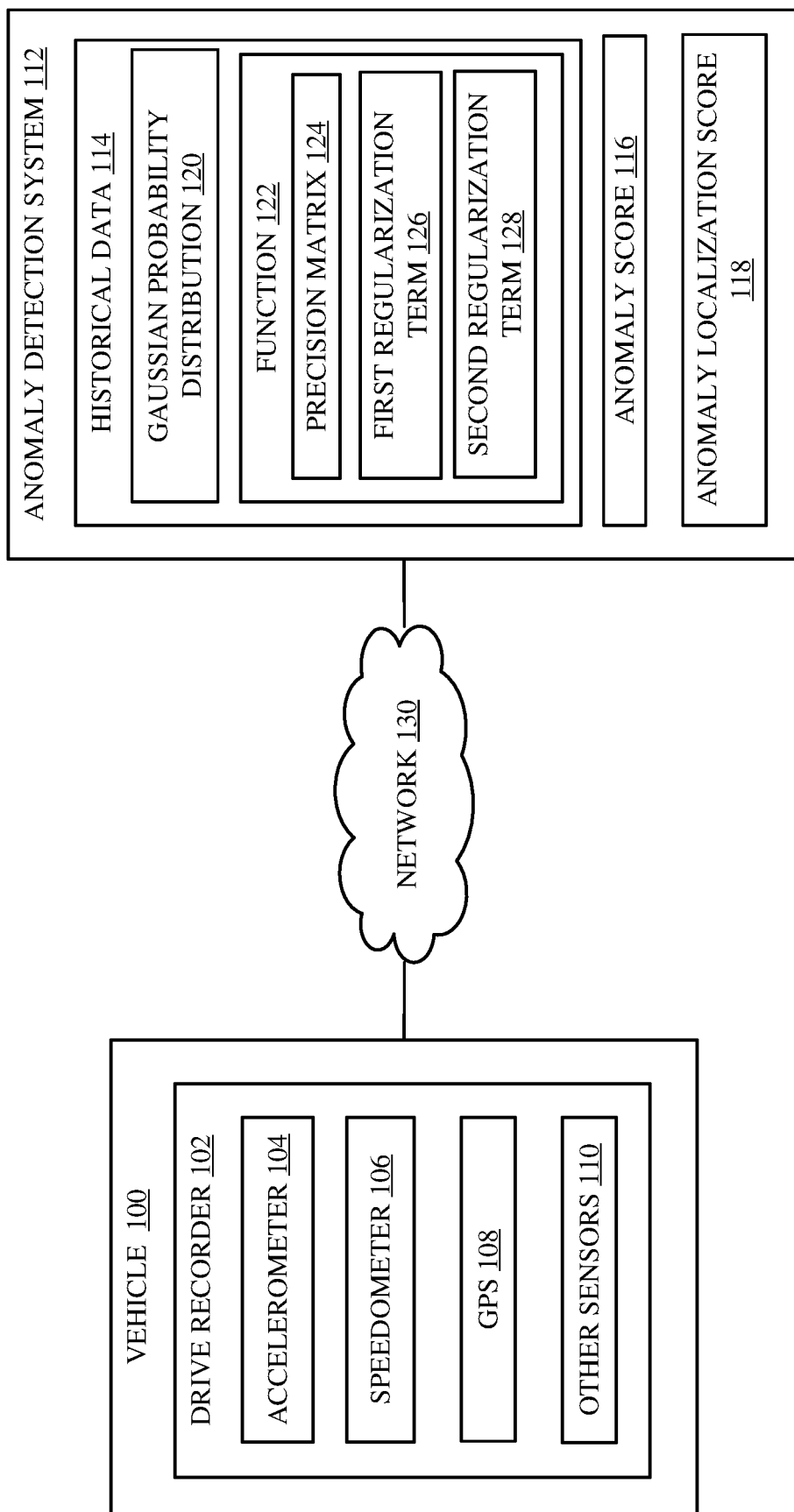
FIG. 1 illustrates a block diagram of an example vehicle communicatively coupled to an anomaly detection system, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward anomaly detection, and, more specifically, to fair anomaly detection and localization. While not limited to such applications, embodiments of the present disclosure may be better understood in light of the aforementioned context.

Various strategies for fairness exist in supervised learning, but there are no known strategies for handling fairness in anomaly detection and localization using unsupervised learning with unlabeled training data. Fairness as it relates to anomaly detection has various definitions. A first definition is that the prediction of an anomaly is independent of any unfair feature. However, this definition ignores unfair features which may lead to performance degradation of the anomaly detection and localization model. A second definition for fairness in anomaly detection is that there is no cause-and-effect relationship between unfair features and a predicted anomaly. However, causality is difficult to explicitly derive from machine learning models. Thus, this definition is impractical to implement in machine learning applications. A third definition for fairness in anomaly detection indicates that the prediction of an anomaly is independent of unfair features conditioned on the other features. Aspects of the present disclosure utilize this third definition of fairness in anomaly detection and localization. Advantageously, this third definition allows the use of unfair features to maintain performance of the anomaly detection and localization model while using regularization terms to equalize (e.g., make more similar) the outputs for data having similar fair features and dissimilar unfair features.

Aspects of the present disclosure realize one or more of the following features. First, aspects of the present disclosure utilize a first regularization term to increase the fairness of the anomaly detection in the anomaly detection and localization model. The first regularization term can be defined as a term configured to reduce the difference between two anomaly scores computed from two samples with dissimilar unfair features and similar fair features. Making anomaly scores approximately equal for the two samples discussed above suggests that there is no influence of the dissimilar unfair features on the anomaly scores (e.g., the outputs of the model are independent of the unfair features). Returning to the drive recorder example above, the dissimilar unfair features may be car model (e.g., van, convertible, etc.), age, and so on, whereas the similar fair features may relate to speed, acceleration, location, braking pattern, and so on.

A second aspect of the present disclosure uses a second regularization term to increase the fairness of the anomaly localization in the anomaly detection and localization model. Similar to the first regularization term, the second regularization term related to anomaly localization can be defined as a term configured to reduce the difference between two anomaly localization scores computed from two samples with dissimilar unfair features and similar fair features (e.g., so that the outputs of the model are independent of the unfair features).

According to a third aspect of the present disclosure, the anomaly score can be a negative likelihood (or negative log likelihood) of a sample according to an anomaly detection and localization model trained on normal (non-anomalous) data. In some embodiments, the anomaly detection and localization model trained on normal data can be based on a Gaussian probability distribution (e.g., a normal probability distribution) and/or using a maximum likelihood estimation (MLE) technique.

According to a fourth aspect of the present disclosure, the anomaly localization scores can be based on a negative conditional likelihood (or negative log conditional likelihood) of the anomaly detection and localization model trained on normal data. Said another way, the anomaly localization scores can indicate those features which contributed most to the determination of an anomaly (e.g., the anomaly score).

Turning now to a more detailed discussion of some aspects of the present disclosure, Aspects of the present disclosure can learn parameters of a Gaussian distribution of a model based on feature vectors x. Although a Gaussian distribution is primarily discussed herein, any number of other probability distributions are within the spirit and scope of the present disclosure. Subsequently, anomaly scores can be based on the likelihood of the newly observed data x occurring according to the Gaussian distribution. Only the precision matrix $\Lambda$ of the Gaussian distribution ($\mathcal{N} x|0, \Lambda^{-1}$) is learned in training. The precision matrix $\Lambda$ (sometimes referred to as a concentration matrix) can be an inverse of the covariance matrix. Advantageously, zeros in the precision matrix $\Lambda$ can indicate conditional independence between corresponding variables. Thus, the precision matrix $\Lambda$ is uniquely suited to identifying influences (including unfair influences) between variables (e.g., based on non-zero elements of the precision matrix $\Lambda$), quantifying the degree of influence (e.g., based on how close to zero each element of the precision matrix $\Lambda$ is), and reducing the influence of unfair features on anomaly detection and localization (e.g., by introducing regularization terms that reduce elements in the precision matrix $\Lambda$ reflecting dependencies between unfair features and fair features).

Equation 1 determines the values of precision matrix $\Lambda$ which minimizes (e.g., reduces below a threshold, or minimizes according to computational parameters) a function of the sum of the log-likelihood of the Gaussian distribution, an L1 regularization term for the precision matrix $\Lambda$ (e.g., a Least Absolute Shrinkage and Selection Operator (LASSO) regression regularization), a first regularization term (e.g., the anomaly score regularization term), and a second regularization term (e.g., the anomaly localization score regularization term).

$$\operatorname*{argmin}_{\Lambda} E_{p(x)}[-\ln N(x \mid 0, \Lambda^{-1})] + \rho|\Lambda| + \qquad \text{Equation 1}$$

$$\alpha E_{p(x),p(x')}\left[ I(x_{-u}, x'_{-u})\left(\left\|\ln\frac{N\{x_u, x_{-u}\} \mid 0, \Lambda^{-1}}{N\{x'_u, x'_{-u}\} \mid 0, \Lambda^{-1}}\right\| + \right.\right.$$

$$\left.\left. \sum_d \left\|\ln\left(\frac{N(x_d \mid \{x_u, x_{-\{u,d\}}\}, 0, \Lambda^{-1})}{Nx'_d \mid \{x'_u, x_{-\{u,d\}}\}, 0, \Lambda^{-1}}\right)\right\|^2 \right]$$

In Equation 1, x represents the input data, where x can be associated with any number of dimensions representing any number D of different data inputs, features, or sources d. In other words, $x \in \mathbb{R}^D (D \in \mathbb{N})$ can represent D-dimensional input data for training samples N. In some embodiments, x is standardized so that the mean vector is zero. In some embodiments, standardizing x so that the mean vector is zero includes determining an average of each data input of the D different data inputs and converting the average to zero by a function so that when the function is applied to any individual data inputs, positive values represent deviations above the average and negative values represent deviations below the average. In some embodiments, the mean vector refers to the mean vector of the Gaussian distribution. Unfair features can be classified as $x_u$ and remaining features (e.g., fair features) can be classified as $x_{-u}$ (e.g., the complement features of the unfair feature $x_u$). The term $\Lambda$ represents the precision matrix of the Gaussian distribution of $\mathcal{N} x|0, \Lambda^{-1}$. The term p(x) is the underlying probability distribution for x, while the term E relates to the expectation over p(x). The terms $\rho$ and $\alpha$ are coefficients that can be moderated depending on the design of the anomaly detection model. The term $I(x_{-u}, x'_{-u})$ is a function that returns one (1) when $x_{-u} = x'_{-u}$ (e.g., similar fair features between different inputs) else it returns zero (0), where x and x' are different input samples. More generally, the components of Equation 1 can be summarized as $E_{p(x)}[-\ln \mathcal{N}(x|0, \Lambda^{-1})]$ equaling the negative log likelihood of the Gaussian distribution, the term $\rho|\Lambda|$ referring to an L1 regularization term, the term $$\left\|\ln\frac{N\{x_u, x_{-u}\} \mid 0, \Lambda^{-1}}{N\{x'_u, x'_{-u}\} \mid 0, \Lambda^{-1}}\right\|^2$$

reflecting the degree of equalized probability of anomaly detection (e.g., likelihoods) between different input data with similar fair features and dissimilar unfair features, and the term $$\Sigma_d \left\|\ln\frac{N(x_d \mid \{x_u, x_{-\{u,d\}}\}, 0, \Lambda^{-1})}{Nx'_d \mid \{x'_u, x_{-\{u,d\},}\}, 0, \Lambda^{-1}}\right\|^2$$

reflecting the degree of equalized probability of anomaly localization (e.g., conditional likelihoods) between input data with similar fair features and dissimilar unfair features.

Equation 1 can be simplified to Equation 2, where Equation 2 can cancel redundant terms, approximate E (e.g., using a sample average), and make use of an empirical covariance matrix S.

$$\operatorname*{argmin}_{\Lambda} -\ln det(\Lambda) + tr(S\Lambda) + \rho|\Lambda| + \qquad \text{Equation 2}$$

$$\frac{\alpha}{N^2} \sum_{n,m}^{N,N} \left\| \frac{1}{2}([x_n]_u - [x'_m]_u)^2 \Lambda_{u,u} \right\|^2 +$$

$$\frac{\alpha}{N^2 D} \sum_{n,m}^{N,N} \left\| \frac{1}{2} \frac{1}{\Lambda_{u,u}} \sum_{d,i}^{D,D} \Lambda_{d,u} \Lambda_{d,i} ([x_n]_i [x_n]_u - [x'_m]_i [x'_m]_u) \right\|^2$$

The terms of Equation 2 can be grouped together for a better understanding of the components of Equation 2. For example, the portion −ln det(Λ)+tr(SΛ) represents the negative log likelihood of the Gaussian distribution, the portion ρ|Λ| remains the L1-regularization term, the portion $$\frac{\alpha}{N^2} \sum_{n,m}^{N,N} \left\| \frac{1}{2}([x_n]_u - [x'_m]_u)^2 \Lambda_{u,u} \right\|^2$$

reflects the degree of equalized probability of anomaly detection (e.g., likelihoods) between input data with similar fair features and dissimilar unfair features, and the portion $$\frac{\alpha}{N^2 D} \sum_{n,m}^{N,N} \left\| \frac{1}{2} \frac{1}{\Lambda_{u,u}} \sum_{d,i}^{D,D} \Lambda_{d,u} \Lambda_{d,i} ([x_n]_i [x_n]_u - [x'_m]_i [x'_m]_u) \right\|^2$$

reflects the degree of equalized probability of anomaly localization (e.g., conditional likelihoods) between input data with similar fair features and dissimilar unfair features.

In some embodiments, the anomaly detection model learns precision matrix Λ by determining the precision matrix Λ that minimizes (e.g., reduces below a threshold, or minimizes according to computational parameters) Equation 2 using Stochastic Gradient Descent (SGD). In other embodiments, the anomaly detection model learns precision matrix Λ by minimizing Equation 2 using Block Coordinate Gradient Descent, or another method such as, but not limited to, Cyclic Block Coordinate Descent, Randomly Permuted Cyclic Block Coordinate Descent, Randomized Block Coordinate Descent, and so on. Furthermore, although aspects of the present disclosure discuss minimizing the function of Equation 1 or 2 by manipulating precision matrix Λ, the term minimizing can refer to any amount of reduction in the functions and does not necessarily refer to an absolute minimum value. For example, in some embodiments, the functions are reduced below a threshold quantity, or, in other embodiments, the functions are reduced for a number of predetermined computational iterations or approximations.

Some embodiments utilizing Glasso (e.g., Graphical LASSO) together with the Block Coordinate Gradient Descent are advantageous insofar as the gradient for each matrix component can be computed separately (even in light of the first regularization term and the second regularization term as discussed in Equations 1 and 2). Furthermore, the summation over training samples x (N*N repetitions) for the first regularization term and the second regularization term discussed in Equations 1 and 2 can be computed before performing the Block Coordinate Gradient Descent (or any other gradient descent method). This means that for each gradient step of the precision matrix $\Lambda_{d,i}$ there is no summation over N samples or D features. Accordingly, in each gradient step, the order of computational complexity does not change by introducing the first regularization term insofar as the orders for computing these terms are O(1).

In contrast, the order of the computational complexity for the preprocessing step is increased from O(D^2*N), which is the cost for computing the empirical covariance matrix S, to O(D^2*N^2) (N times larger) which is the cost for preprocessing for the second regularization term. However, it should be noted that this computation is only required before the Stochastic Gradient Descent (SGD) operation, where the number of SGD steps can be more than several times of the number of training samples, N. Thus, the additional computational complexity introduced by the second regularization term is relatively less significant.

Collectively, Equations 1 and 2 can be simplified so that the anomaly scores can be based on the negative log likelihood of the Gaussian probability of a training data set and the precision matrix (e.g., −ln $\mathcal{N}$ (x|0,$\Lambda^{-1}$)), whereas the anomaly localization scores can be based on the negative log conditional likelihood of the Gaussian probability of a training data set for an input feature $x_d$ conditioned on its complement features $x_{-d}$ and the precision matrix (e.g., −ln $\mathcal{N}$ ($x_d$|$x_{-d}$,0,$\Lambda^{-1}$)).

Turning now to the figures, FIG. 1 illustrates a block diagram of an example vehicle 100 having a drive recorder 102 that is communicatively coupled to an anomaly detection system 112 (also referred to as an anomaly detection model) via a network 130, in accordance with some embodiments of the present disclosure. Network 130 is shown for ease of discussion, but in other embodiments, one or more permanent or intermittent networks of similar or dissimilar types can be used to connect multiple vehicles 100 to anomaly detection system 112. As non-limiting examples, network 130 can include a wide-area network (WAN), a local area network (LAN), an intranet, the Internet, a cellular network (e.g., 3G, 4G, 5G), a personal-area network (PAN), or the like. In some embodiments, network 130 is a short-range network connection (e.g., networks utilizing Institute of Electrical and Electronics Engineers (IEEE) 802.15 standards, IEEE 1902.1 standards, personal-area networks (PAN), Bluetooth™ networks, Near Field Communication (NFC) networks, Infrared Data Association (IrDA) networks, Internet Protocol version 6 (IPv6) over Low-Power Wireless Personal-Area Networks (6LoWPAN), DASH7 Alliance Protocol (D7A) networks, RuBee networks, Ultra-wideband (UWB) networks, Frequency Modulation (FM)-UWB networks, Wireless Ad Hoc Networks (WANET), Z-Wave networks, ZigBee™ networks, and other short-range networks), or another connection enabling communication between vehicle 100 and anomaly detection system 112.

The vehicle 100 can be any non-autonomous, semi-autonomous, or autonomous vehicle. The vehicle 100 can have included thereon a drive recorder 102 suitable for aggregating, storing, and transmitting data associated with vehicle performance and/or operator performance of the vehicle 100. Drive recorder 102 can collect data from various sensors such as, but not limited to, accelerometer 104 (e.g., collecting linear acceleration or angular acceleration data), speedometer 106 (e.g., collecting velocity data), global positioning system (GPS) 108 (e.g., collecting latitude, longitude, country, region, state, city, and/or other location data), and/or other sensors 110 (e.g., temperature sensors, pressure sensors, positional sensors, etc.). Other sensors 110 can collect a variety of other types of data associated with the vehicle 100 such as, for example, throttle position, engine temperature, engine revolutions per minute (RPM), steering wheel position, braking levels, driving mode (e.g., cruise control, adaptive cruise control, semi-autonomous, etc.), engine vehicle codes, and/or other data.

The drive recorder 102 can transmit the data collected by the drive recorder 102 to the anomaly detection system 112 via the network 130. In various embodiments, the data can be transmitted continuously, semi-continuously, or in batches.

The anomaly detection system 112 can be trained using historical data 114 (also referred to as training data). In some embodiments, the historical data 114 is historical drive recorder data representing normal (e.g., non-anomalous) driving behavior. The anomaly detection system 112 can be trained by (i) standardizing the historical data 114 (e.g., in order to make the mean feature vector equal to zero), (ii) learning a Gaussian probability distribution 120 of the standardized historical data 114, and (iii) reducing a function 122 below a threshold by manipulating (e.g., modifying, tuning, etc.) a precision matrix $\Lambda$ 124 of the Gaussian probability distribution 120 while utilizing a first regularization term 126 related to anomaly detection fairness and/or a second regularization term 128 related to anomaly localization fairness. As previously discussed, the function 122 can be the function shown in Equation 1 and/or Equation 2. Furthermore, the first regularization term 126 can be $$\left\| \ln \frac{N\{x_u, x_{-u}\} \mid 0, \Lambda^{-1}}{N\{x_{ru}, x'_{-u}\} \mid 0, \Lambda^{-1}} \right\|^2$$

(as shown in Equation 1) or $$\frac{\alpha}{N^2} \sum_{n,m}^{N,N} \left\| \frac{1}{2}([x_n]_u - [x'_m]_u)^2 \Lambda_{u,u} \right\|^2$$

(as shown in Equation 2). Meanwhile, the second regularization term 128 can be $$\sum_d \left\| \ln \left( \frac{N(x_d \mid \{x_u, x_{-u,d}\}, 0, \Lambda^{-1})}{Nx'_d \mid \{x'_u, x_{r-\{u,d\}}\}, 0, \Lambda^{-1}} \right) \right\|^2$$

(as shown in Equation 1) or $$\frac{\alpha}{N^2 D} \sum_{n,m}^{N,N} \left\| \frac{1}{2} \frac{1}{\Lambda_{u,u}} \sum_{d,i}^{D,D} \Lambda_{d,u} \Lambda_{d,i} ([x_n]_i [x_n]_u - [x'_m]_i [x'_m]_u) \right\|^2$$

(as shown in Equation 2). In some embodiments, the historical data 114 is unlabeled historical data, and the training of the anomaly detection system 112 is unsupervised training.

After training the anomaly detection system 112 (e.g., by learning the precision matrix $\Lambda$ 124 that decreases the function 122 below a threshold), the anomaly detection system 112 can receive data from the drive recorder 102 and output an anomaly score 116 and an anomaly localization score 118. In some embodiments, the data received from the drive recorder 102 is preprocessed to standardize it in a manner that is consistent with the standardizing of the historical data 114. In some embodiments, the anomaly score 116 can be the negative log likelihood for new data x according to the Gaussian probability distribution 120 and the learned precision matrix $\Lambda$ 124 (e.g., $-\ln \mathcal{N}(x \mid 0, \Lambda^{-1})$). The anomaly score 116 can be useful for indicating whether or not an anomaly occurred. Further, in some embodiments the anomaly localization score 118 can be the negative log conditional likelihood for new data x according to the conditional likelihood for $x_d$ in light of complementary features $x_{-d}$ according to the Gaussian probability distribution 120 and the learned precision matrix $\Lambda$ 124 (e.g., $-\ln \mathcal{N}(x_d \mid x_{-d}, 0, \Lambda^{-1})$). The anomaly localization score 118 can be useful for indicating a source or cause of any detected anomaly.

The anomaly score 116 and the anomaly localization score 118 can be utilized in any number of ways. For example, the scores can be utilized by an automotive manufacturer to refine warranties, to improve vehicle safety, and/or to understand customer usage. The scores can be utilized by an automotive parts supplier to improve reliability and/or safety. The scores can be utilized by an automotive insurance company to adjust insurance rates based on driving behavior. The scores can be utilized by civil engineers and city planners to modify road designs for improved safety. Furthermore, the scores can be utilized by the vehicle 100 itself. For example, the vehicle 100 can present a notification or warning to an operator of the vehicle based on the scores. As another example, the vehicle 100 can transmit a notification or warning to, for example, an emergency service based on the scores. As yet another example, the vehicle 100 can modify or alter the functioning of the vehicle 100 based on the scores such as, but not limited to, accelerating, decelerating, turning, braking, and the like.

Although FIG. 1 illustrates the vehicle 100 communicatively coupled to the anomaly detection system 112 via the network 130, in other embodiments, the vehicle 100 can include the anomaly detection system 112 stored therein. For example, the anomaly detection system 112 can be co-located with the drive recorder 102 in the vehicle 100. In such embodiments, the anomaly detection system 112 can be trained on a remote data processing system and downloaded to the vehicle 100. In other embodiments, a partially trained or untrained anomaly detection system 112 can be downloaded to the vehicle 100 from a remote data processing system, and the anomaly detection system 112 can train itself in real-time or on-the-fly during operation of vehicle 100 for embodiments where vehicle-specific and/or operator-specific training may be desired.

Figure 2:
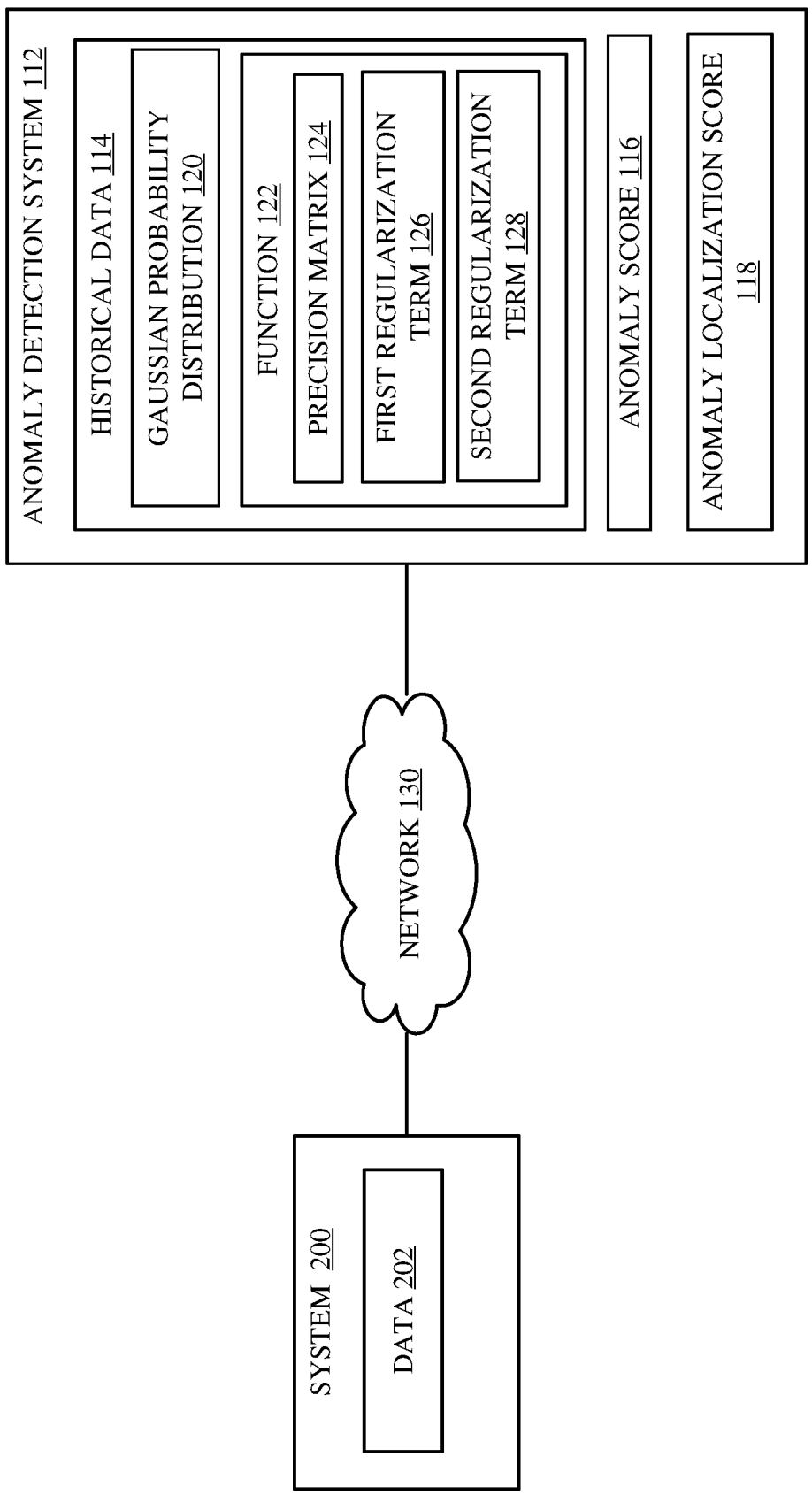
FIG. 2 illustrates a block diagram of an example system communicatively coupled to an anomaly detection system, in accordance with some embodiments of the present disclosure.

Referring now to FIG. 2, illustrated is an example system 200 generating data 202 for transmittal to, and analysis by, the anomaly detection system 112 illustrated in FIG. 1, in accordance with some embodiments of the present disclosure. While FIG. 1 discussed a driver recorder 102 in a vehicle 100, aspects of the present disclosure are applicable to any number of industries and applications. For example, system 200 can be devices or applications in a healthcare setting generating data 202 (e.g., patient monitoring, patient billing, etc.), devices or applications in an industrial setting (e.g., quality control data of parts in a manufacturing plant, process control data in a refinery, rig data for an onshore or offshore drilling rig, etc.), a financial application (e.g., loan origination, credit report, etc.), a travel application (e.g., insights into flight delays, cancelations, etc.), and the like. Further in contrast to FIG. 1, where the drive recorder 102 collected data from sensors, as shown in FIG. 2, the data 202 need not necessarily come from sensors (though it can) but can come from purely electronic data (e.g., text messages, internet search terms, applications, resumes, and the like).

Anomaly detection system 112 can function similarly in FIG. 2 as previously discussed in FIG. 1, except where the data of FIG. 1 was received from a drive recorder 102, the data 202 in FIG. 202 is received from the system 200. The data 202 can have more features, fewer features, or similar numbers of features as the data discussed with respect to FIG. 1.

Although FIG. 2 illustrates the system 200 communicatively coupled to the anomaly detection system 112 by the network 130, in other embodiments, the system 200 can have the anomaly detection system 112 stored therein. For example, the anomaly detection system 112 can be co-located with the data 202 in the system 200. In such embodiments, the anomaly detection system 112 can be trained on a remote data processing system and downloaded to the system 200. In other embodiments, a partially trained or untrained anomaly detection system 112 can be downloaded to the system 200 from a remote data processing system, and the anomaly detection system 112 can train itself in real-time or on-the-fly during operation of system 200 for embodiments where system-specific and/or operator-specific training may be desired.

Figure 3:
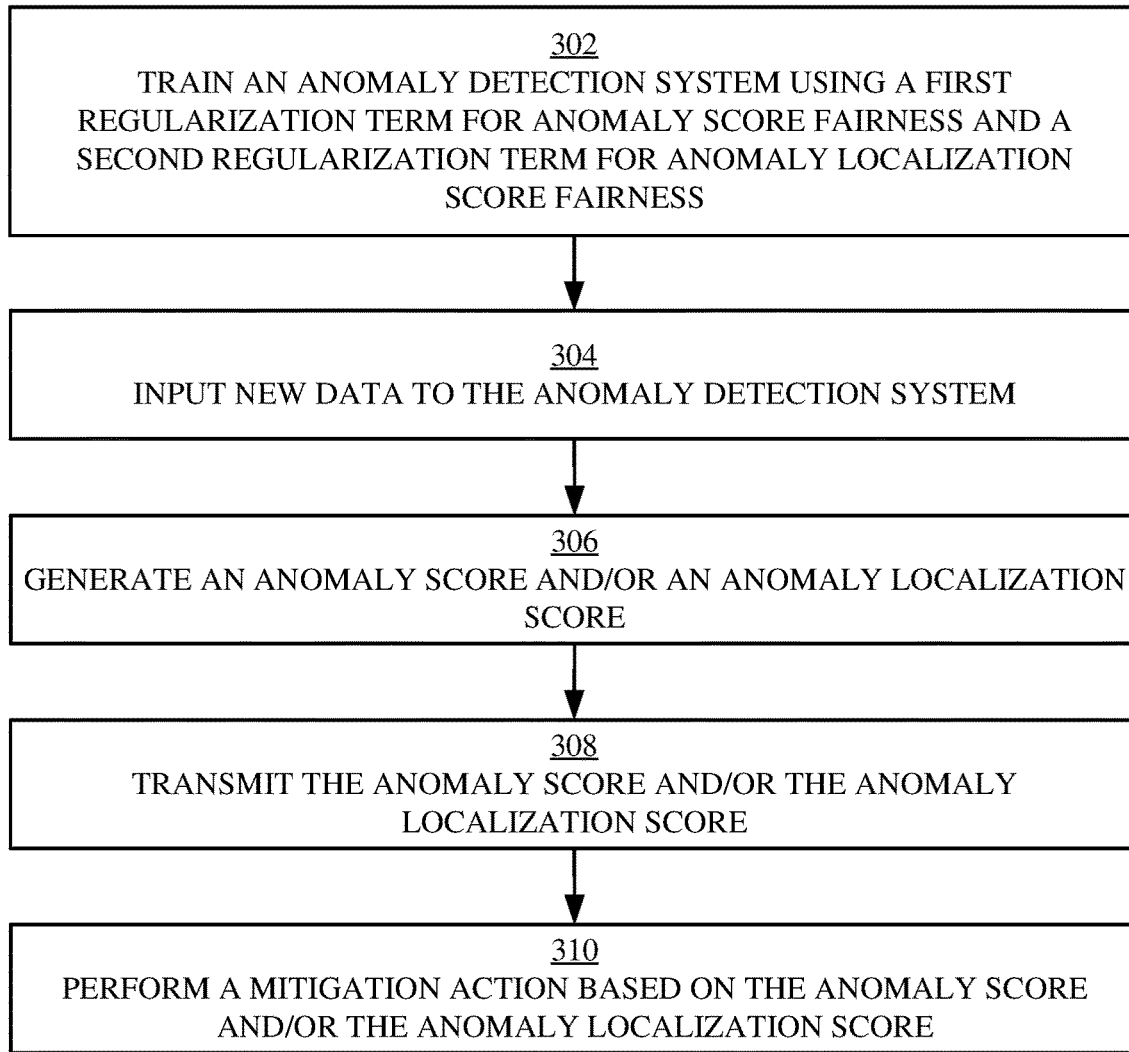
FIG. 3 illustrates a flowchart of an example method for utilizing an anomaly detection system, in accordance with some embodiments of the present disclosure.

FIG. 3 illustrates a flowchart of an example method 300 for utilizing the anomaly detection system 112 illustrated in FIGS. 1 and 2, in accordance with some embodiments of the present disclosure. The method 300 can be implemented by an anomaly detection system 112, a computer, a processor, or another configuration of hardware and/or software.

Operation 302 includes training (or generating) an anomaly detection system 112 using a first regularization term for anomaly score fairness and a second regularization term for anomaly localization score fairness. In some embodiments, the anomaly detection system 112 is trained by learning a precision matrix $\Lambda$ 124 that reduces a function 122 below a threshold, where the function includes at least one of a negative log likelihood of a Gaussian probability distribution 120 for the training data 114, a L1 regularization term, the first regularization term 126 for anomaly score fairness, and the second regularization term 128 for anomaly localization score fairness. In some embodiments, the first regularization term 126 for anomaly score fairness makes anomaly scores 116 similar for inputs with similar fair features and dissimilar unfair features, thereby reducing or removing the influence of the unfair features. Similarly, in some embodiments, the second regularization term 128 for anomaly localization score fairness makes anomaly localization scores 118 similar for inputs with similar fair features and dissimilar unfair features, thereby reducing or removing the influence of the unfair features. In some embodiments, operation 302 includes downloading the anomaly detection system 112 from a remote data processing system to a device such as a computer, a server, a vehicle 100, a system 200, or another device.

Operation 304 includes inputting new data (e.g., data from drive recorder 102 or data 202) to the anomaly detection system 112. Operation 306 includes generating an anomaly score 116 and/or an anomaly localization score 118 by the anomaly detection system 112 based on the new data. In some embodiments, the anomaly score 116 can be based on the negative log likelihood of the Gaussian probability distribution 120 of the historical data 114 for the new data, the precision matrix $\Lambda$ 124, and/or the mean vector (e.g., $-\ln \mathcal{N}(x|0,\Lambda^{-1})$), whereas the anomaly localization score 118 can be based on the negative log conditional likelihood of the Gaussian probability distribution 120 of the historical data 114 for a feature of the new data conditioned on its complement features, the precision matrix $\Lambda$ 124, and/or the mean vector (e.g., $-\ln \mathcal{N}(x_d|x_{-d},0,\Lambda^{-1})$).

Operation 308 includes transmitting the anomaly score 116 and/or the anomaly localization score 118 to another device, system, sub-system, or computer. In some embodiments, the anomaly score 116 and/or the anomaly localization score 118 are transmitted via a network 130 to a remote data processing system.

Operation 310 includes performing a mitigation action based on the anomaly score 116 and/or the anomaly localization score 118. The mitigation action can relate to a notification, alert, report, or warning presented to a user, a notification, alert, report, or warning transmitted to, for example, an emergency service, and/or a modification of one or more devices or systems associated with the anomaly score 116 and/or the anomaly localization score 118. In embodiments where the device associated with the anomaly score 116 and/or the anomaly localization score 118 is a vehicle 100, the mitigation action can relate to accelerating, decelerating, turning, braking, and the like.

Figure 4:
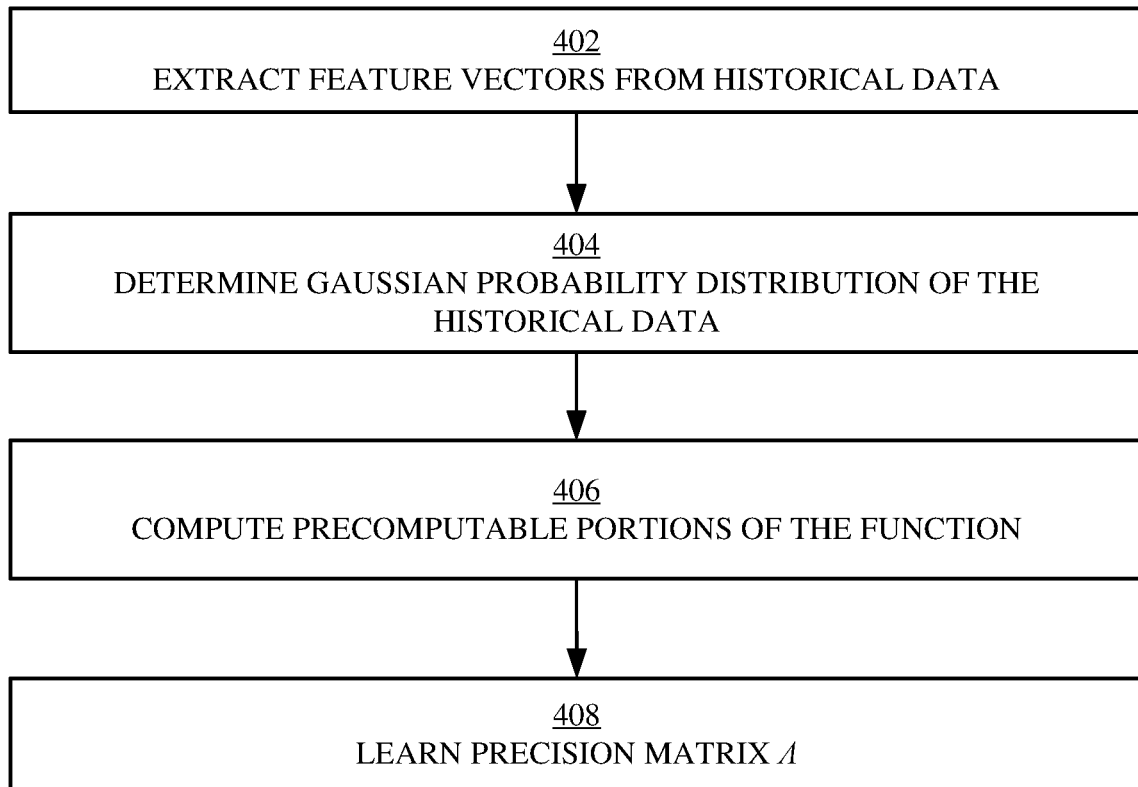
FIG. 4 illustrates a flowchart of an example method for generating or training an anomaly detection system or model, in accordance with some embodiments of the present disclosure.

FIG. 4 illustrates a flowchart of an example method 400 for training an anomaly detection system 112, in accordance with some embodiments of the present disclosure. The method 400 can be implemented by an anomaly detection system 112, a computer, a processor, or another configuration of hardware and/or software. In some embodiments, the method 400 is a sub-method of operation 302 of FIG. 3.

Operation 402 includes extracting feature vectors from historical data 114. In some embodiments, operation 402 includes standardizing the feature vectors so that a mean vector is equal to zero.

Operation 404 includes determining a Gaussian probability distribution 120 of the feature vectors of the historical data 114. Operation 406 includes computing the precomputable portions of the function 122 (e.g., precomputable portions of Equations 1 or 2). For example, in Equation 2, operation 406 can include computing the empirical covariance matrix S and/or other precomputable parts of the regularization terms.

Operation 408 includes learning the precision matrix $\Lambda$ 124 by reducing or minimizing the function 122 through manipulations to the precision matrix $\Lambda$ 124. In some embodiments, operation 406 includes using Stochastic Gradient Descent (SGD). In other embodiments, the anomaly detection model learns precision matrix $\Lambda$ 124 by using Block Coordinate Gradient Descent, or another method such as, but not limited to, Cyclic Block Coordinate Descent, Randomly Permuted Cyclic Block Coordinate Descent, Randomized Block Coordinate Descent, and so on. Operation 406 can include reducing the function 122 below a predetermined threshold, reducing the function 122 until consecutive iterations result in a change below a predetermined threshold, reducing the function 122 for a predetermined number of iterations, reducing the function 122 until an absolute minimum value is found, or another methodology for reducing the function 122 an acceptable amount.

FIG. 5 illustrates a table 500 of experimental results for some aspects of the present disclosure. The experimental validation of aspects of the present disclosure was performed on a synthetic data set including N=1000 data points for training and testing and a feature count of D=10. A covariance matrix $\Lambda$ was randomly generated with positive and semi-definite restrictions. D-dimensional data was then generated from the distribution $\mathcal{N}(x|0, \Sigma)$. Unfair features were set as $x_u$ whereas anomalous features were set as $x_a$ (where $x_a$ must not equal $x_u$). For half of the test data, variances and covariances related to $x_a$ were corrupted.

Two types of Area Under the Curve (AUC) data were used to evaluate the results. AUC-Anomaly Detection (AUC AD) was used for detecting whether the anomaly classification of each input was correct or not and AUC-Anomaly Localization (AUC AL) was used to determine if root causes of detected anomalies were correct or not. Furthermore, the fairness was evaluated by determining if anomaly scores 116 and anomaly localization scores 118 for data with similar fair features and dissimilar unfair features were, in fact, similar. An Equalized Odds for Anomaly Detection (EO AD) measure of fairness constituted a squared difference between two anomaly scores 116 computed from two samples, whereas an Equalized Odds for Anomaly Localization (EO AL) (e.g., $$\left\| \ln \frac{N\{x_u, x_{-u}\} \mid 0, \Lambda^{-1}}{N\{x_{ru}, x'_{-u}\} \mid 0, \Lambda^{-1}} \right\|^2$$

measure of fairness constituted a squared difference between two anomaly localization scores 118 for all the features computed from two samples (e.g., $$\left( e.g., \sum_d \left\| \ln \frac{N(x_d \mid \{x_u, x_{-u,d}\}, 0, \Lambda^{-1})}{Nx'_d \mid \{x'_u, x_{t-\{u,d\}}\}, 0, \Lambda^{-1}} \right\|^2 \right).$$

The table 500 compares the results of an anomaly detection model having neither the first regularization term (e.g., related to anomaly scores) nor the second regularization term (e.g., related to anomaly localization scores) to anomaly detection systems 112 having the first regularization term, the second regularization term, and both the first and second regularization terms.

As shown in the table 500, for AUC measures, larger is better, whereas for EO measures, smaller is better. As shown in the table 500, the AUC AD and AUC AL of the three experimental models is equal to or greater than the AUC AD and AUC AL for the baseline model. Similarly, the EO AD and EO AL for each of the three experimental models is less than or equal to the EO AD and EO AL for the baseline model. Collectively, these experimental results indicate that (i) performance is improved (or at least maintained) compared to the baseline model, (ii) fairness is improved in all cases compared to the baseline model, and (iii) performance improvements and fairness improvements are realized when either of the regularization terms are used in isolation, and when both regularization terms are used together. Thus, FIG. 5 illustrates that aspects of the present disclosure successfully realize an anomaly detection system 112 having improved fairness without loss to performance.

Figure 6:
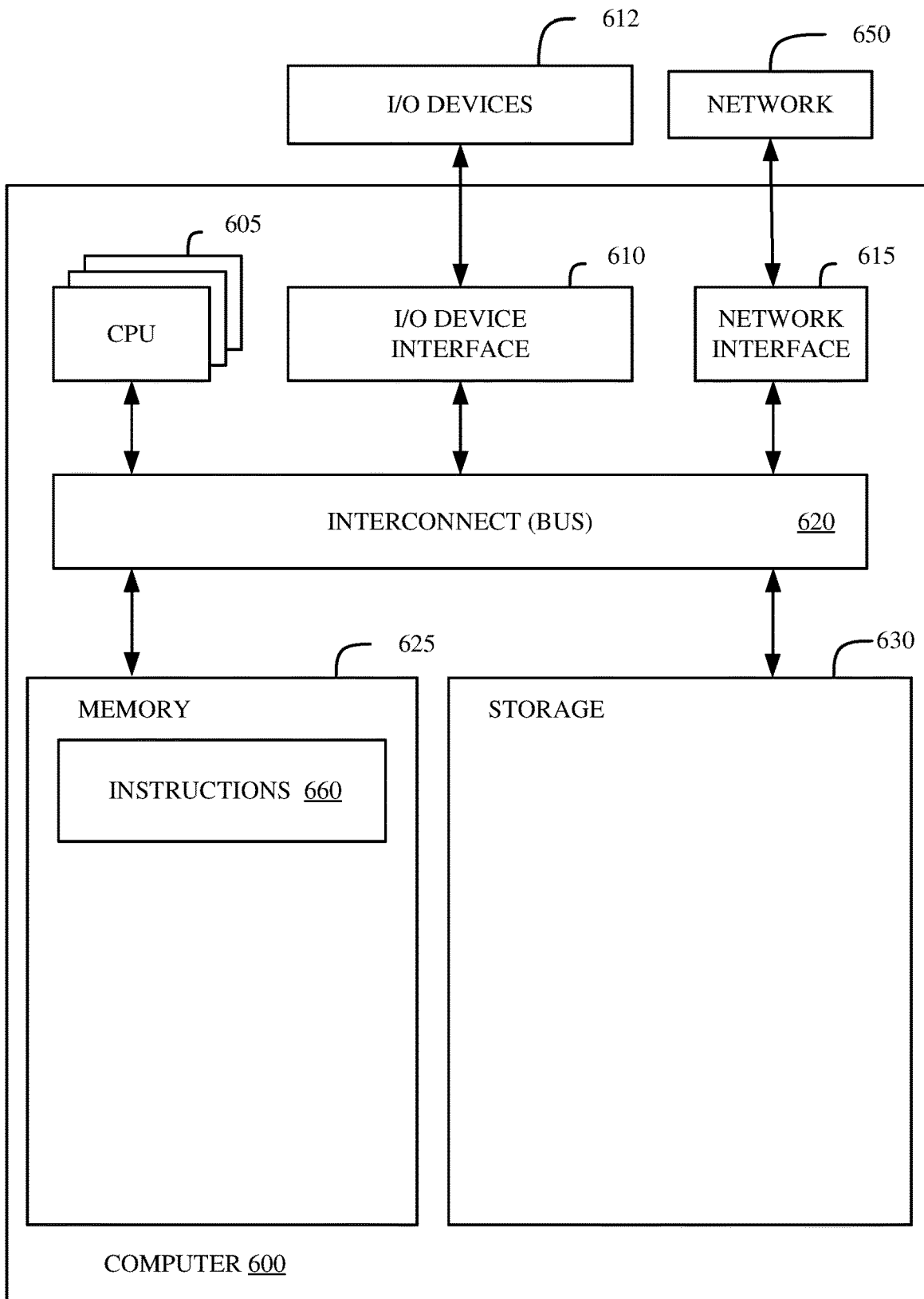
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all of the methods described in FIG. 3-4, implement the functionality discussed in FIGS. 1-2, and/or realize the experimental results discussed in FIG. 5. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) the anomaly detection system 112, the vehicle 100, the drive recorder 102, the system 200, and/or other aspects of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIG. 3-4, implementing the functionality discussed in any portion of FIGS. 1-2, and/or realizing the experimental results discussed in FIG. 5. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
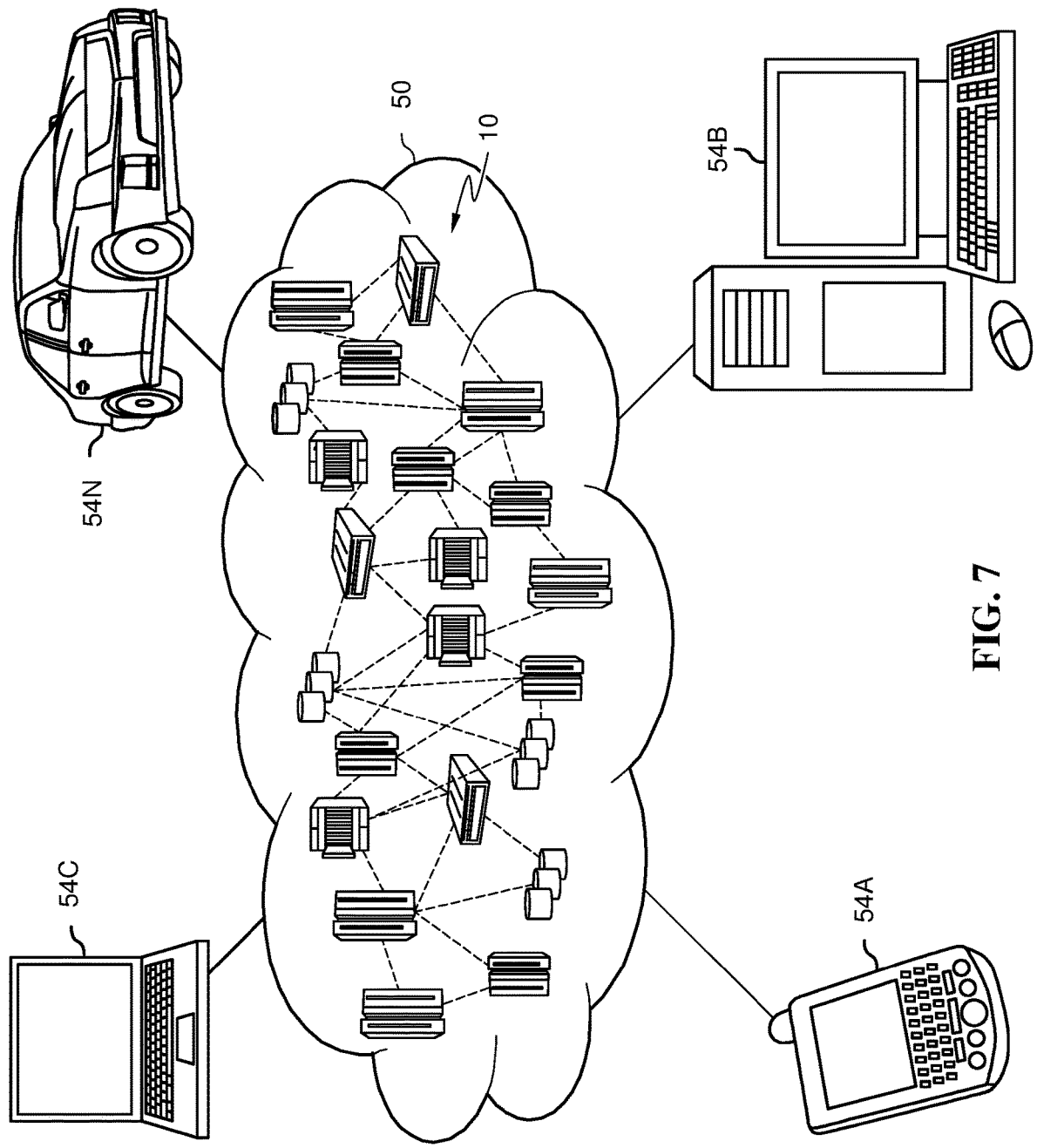
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
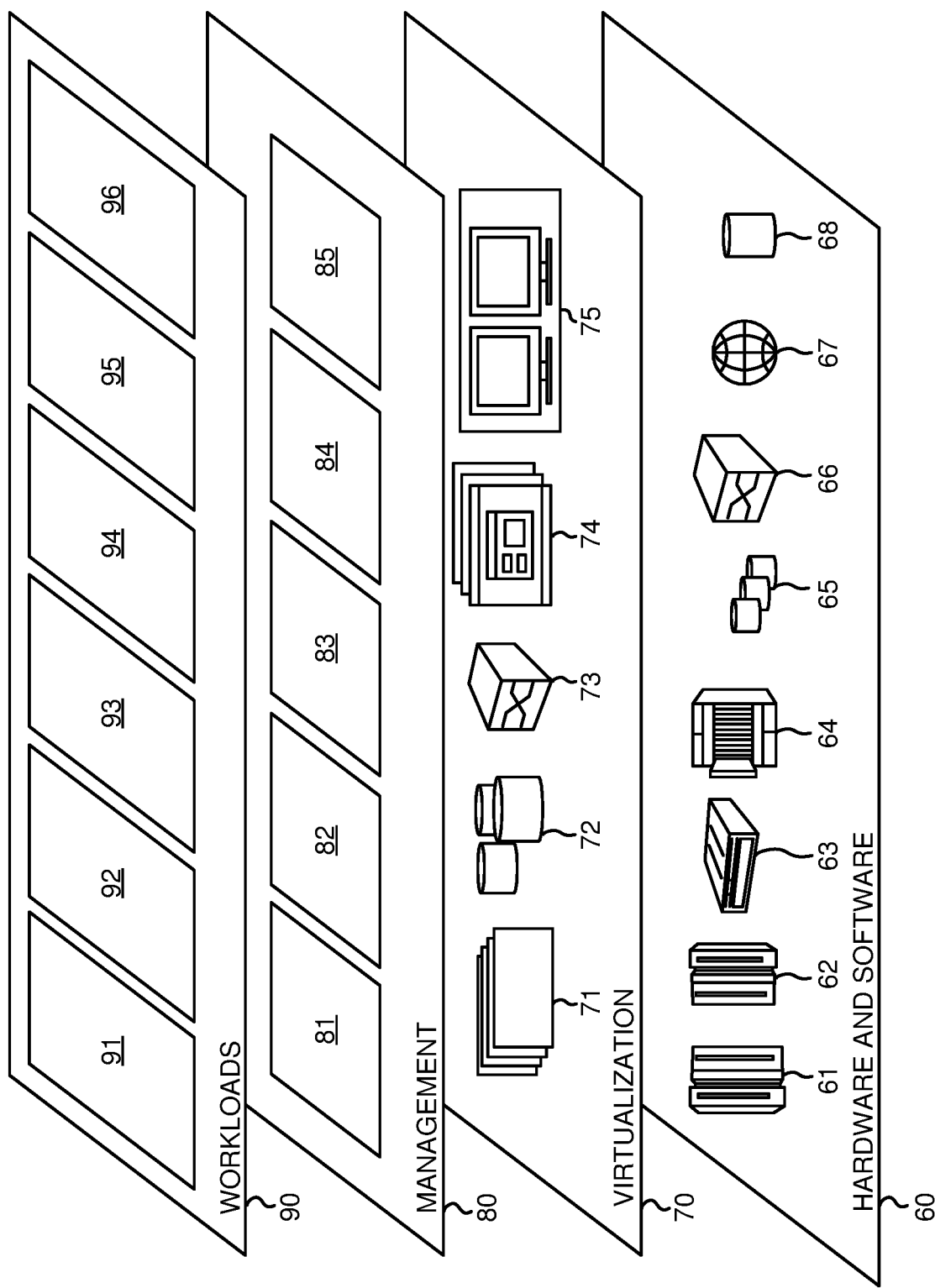
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fair anomaly detection and localization 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 3-4 and/or implement any portion of the functionality discussed in FIGS. 1-2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a system. The system includes a vehicle; a plurality of sensors collecting observed vehicle data; a drive recorder configured to aggregate and store the observed vehicle data; and an anomaly detection system communicatively coupled to the drive recorder, wherein the anomaly detection system includes a probability distribution of historical vehicle data, wherein parameters of the probability distribution are tuned to reduce a function below a threshold, wherein the function is based on the probability distribution conditioned on the historical vehicle data and at least one regularization term configured to generate similar outputs of the probability distribution for inputs having similar fair features and independent of unfair features, wherein the anomaly detection system further includes an anomaly score and an anomaly localization score based on the probability distribution, the parameters, and observed vehicle data.

Example 2 includes the system of example 1, including or excluding optional features. In this example, at least one regularization term comprises a first regularization term configured to generate similar anomaly scores for the inputs having the similar fair features and the dissimilar unfair features and a second regularization term configured to generate similar anomaly localization scores for the inputs having the similar fair features and the dissimilar unfair features.

Example 3 includes the system of any one of examples 1 to 2, including or excluding optional features. In this example, the probability distribution is a Gaussian distribution, and wherein the parameters comprise a mean vector and a precision matrix.

Example 4 includes the system of any one of examples 1 to 3, including or excluding optional features. In this example, reducing the function below the threshold is performed using Stochastic Gradient Descent (SGD).

Example 5 includes the system of any one of examples 1 to 4, including or excluding optional features. In this example, the anomaly detection system is configured to perform a method comprising: performing a mitigation action based on the anomaly score and the anomaly localization score.

Example 6 is a computer-implemented method. The method includes training an anomaly detection system configured to generate an anomaly score and an anomaly localization score for vehicle data, wherein the anomaly detection system is trained to generate similar anomaly scores and anomaly localization scores for historical vehicle data with similar fair features and independent of unfair features using a first regularization term and a second regularization term; receiving, at the anomaly detection system and from a drive recorder collecting data from a plurality of sensors on a vehicle, new vehicle data; generating a first anomaly score and a first anomaly localization score associated with the new vehicle data; and performing a mitigation action based on the first anomaly score and the first anomaly localization score, wherein the mitigation action alters the vehicle.

Example 7 includes the method of example 6, including or excluding optional features. In this example, training the anomaly detection system further comprises: generating a Gaussian probability distribution of the historical vehicle data; and learning a mean vector and a precision matrix that reduces a function below a threshold, wherein the function is based on a negative log likelihood of the Gaussian probability distribution given the historical vehicle data, a L1 regularization term for the precision matrix, the first regularization term, and the second regularization term. Optionally, the first anomaly score and the first anomaly localization score are based on the new vehicle data, the Gaussian probability distribution, the mean vector, and the precision matrix.

Example 8 is a computer-implemented method. The method includes generating an anomaly detection model based on a Gaussian distribution of historical data, a mean vector of the Gaussian distribution, and a precision matrix of the Gaussian distribution, wherein the mean vector and the precision matrix are generated by reducing a function below a threshold, wherein the function includes the Gaussian distribution, a first regularization term configured to generate similar anomaly scores for inputs with similar fair features and independent of unfair features, and a second regularization term configured to generate similar anomaly localization scores for the inputs with the similar fair features and independent of unfair features; inputting a new data to the anomaly detection model; and generating an anomaly score and an anomaly localization score associated with the new data based on the Gaussian distribution, the mean vector, and the precision matrix.

Example 9 includes the method of example 8, including or excluding optional features. In this example, the anomaly score indicates an existence of an anomaly, and wherein the anomaly localization score indicates a source of the anomaly.

Example 10 includes the method of any one of examples 8 to 9, including or excluding optional features. In this example, the function is reduced using Stochastic Gradient Descent (SGD).

Example 11 includes the method of any one of examples 8 to 10, including or excluding optional features. In this example, the anomaly score is a negative log likelihood of the new data according to the Gaussian distribution of the historical data, the mean vector, and the precision matrix.

Example 12 includes the method of any one of examples 8 to 11, including or excluding optional features. In this example, the anomaly localization score is a negative log conditional likelihood of a feature of the new data conditioned on other features of the new data according to the Gaussian distribution of the historical data, the mean vector, and the precision matrix.

Example 13 includes the method of any one of examples 8 to 12, including or excluding optional features. In this example, the anomaly detection model is generated using unsupervised learning, and wherein the historical data is unlabeled training data.

Example 14 includes the method of any one of examples 8 to 13, including or excluding optional features. In this example, the method includes performing a mitigation action based on the anomaly score and the anomaly localization score. Optionally, the mitigation action comprises a modification to a device associated with the new data.

Example 15 includes the method of any one of examples 8 to 14, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 16 is a system. The system includes one or more processors; and one or more computer-readable storage media storing program instructions which, when executed by the one or more processors, are configured to cause the one or more processors to perform a method according to any one of examples 6 to 15.

Example 17 is a computer program product. The computer program product includes one or more computer readable storage media, and program instructions collectively stored on the one or more computer readable storage media, the program instructions comprising instructions configured to cause one or more processors to perform a method according to any one of examples 6 to 15.

What is claimed is:

1. A system comprising:
   a vehicle;
   a plurality of sensors collecting observed vehicle data;
   a drive recorder configured to aggregate and store the observed vehicle data; and
   an anomaly detection system communicatively coupled to the drive recorder, wherein the anomaly detection system includes a probability distribution of historical vehicle data, wherein parameters of the probability distribution are tuned to reduce a function below a threshold, wherein the function is based on the probability distribution conditioned on the historical vehicle data and at least one regularization term configured to generate similar outputs of the probability distribution for inputs having similar fair features and independent of unfair features, wherein the anomaly detection system further includes an anomaly score and an anomaly localization score based on the probability distribution, the parameters, and the observed vehicle data.

2. The system of claim 1, wherein the at least one regularization term comprises a first regularization term configured to generate similar anomaly scores for the inputs having the similar fair features and independent of the unfair features and a second regularization term configured to generate similar anomaly localization scores for the inputs having the similar fair features and independent of the unfair features.

3. The system of claim 1, wherein the probability distribution is a Gaussian distribution, and wherein the parameters comprise a mean vector and a precision matrix.

4. The system of claim 1, wherein reducing the function below the threshold is performed using Stochastic Gradient Descent (SGD).

5. The system of claim 1, wherein the anomaly detection system is configured to perform a method comprising:
   performing a mitigation action based on the anomaly score and the anomaly localization score.

6. A computer-implemented method comprising:
   training an anomaly detection system configured to generate an anomaly score and an anomaly localization score for vehicle data, wherein the anomaly detection system is trained to generate similar anomaly scores and anomaly localization scores for historical vehicle data with similar fair features and independent of unfair features using a first regularization term and a second regularization term;
   receiving, at the anomaly detection system and from a drive recorder collecting data from a plurality of sensors on a vehicle, new vehicle data;
   generating a first anomaly score and a first anomaly localization score associated with the new vehicle data; and
   performing a mitigation action based on the first anomaly score and the first anomaly localization score, wherein the mitigation action alters the vehicle.

7. The method of claim 6, wherein training the anomaly detection system further comprises:
   generating a Gaussian probability distribution of the historical vehicle data; and
   learning a mean vector and a precision matrix that reduces a function below a threshold, wherein the function is based on a negative log likelihood of the Gaussian probability distribution given the historical vehicle data, a L1 regularization term for the precision matrix, the first regularization term, and the second regularization term.

8. The method of claim 7, wherein the first anomaly score and the first anomaly localization score are based on the new vehicle data, the Gaussian probability distribution, the mean vector, and the precision matrix.

9. A computer-implemented method comprising:
   generating an anomaly detection model based on a Gaussian distribution of historical data, a mean vector of the Gaussian distribution, and a precision matrix of the Gaussian distribution, wherein the mean vector and the precision matrix are generated by reducing a function below a threshold, wherein the function includes the Gaussian distribution, a first regularization term configured to generate similar anomaly scores for inputs with similar fair features and independent of unfair features, and a second regularization term configured to generate similar anomaly localization scores for the inputs with the similar fair features and independent of the unfair features;
   inputting a new data to the anomaly detection model; and
   generating an anomaly score and an anomaly localization score associated with the new data based on the Gaussian distribution, the mean vector, and the precision matrix.

10. The method of claim 9, wherein the anomaly score indicates an existence of an anomaly, and wherein the anomaly localization score indicates a source of the anomaly.

11. The method of claim 9, wherein the function is reduced using Stochastic Gradient Descent (SGD).

12. The method of claim 9, wherein the anomaly score is a negative log likelihood of the new data according to the Gaussian distribution of the historical data, the mean vector, and the precision matrix.

13. The method of claim 9, wherein the anomaly localization score is a negative log conditional likelihood of a feature of the new data.

14. The method of claim 9, wherein the anomaly detection model is generated using unsupervised learning, and wherein the historical data comprises unlabeled training data.

15. The method of claim 9, further comprising:
   performing a mitigation action based on the anomaly score and the anomaly localization score.

16. The method of claim 15, wherein the mitigation action comprises a modification to a device associated with the new data.

17. The method of claim 9, wherein the method is performed by one or more computers according to software that is downloaded to the one or more computers from a remote data processing system.

18. The method of claim 17, wherein the method further comprises:
   metering a usage of the software; and
   generating an invoice based on metering the usage.

19. A system comprising:
   one or more processors; and
   one or more computer-readable storage media storing program instructions which, when executed by the one or more processors, are configured to cause the one or more processors to perform a method comprising:
   generating an anomaly detection model based on a Gaussian distribution of historical data, a mean vector of the Gaussian distribution, and a precision matrix of the Gaussian distribution, wherein the mean vector and the precision matrix are generated by reducing a function below a threshold, wherein the function includes the Gaussian distribution, a first regularization term configured to generate similar anomaly scores for inputs with similar fair features and independent of unfair features, and a second regularization term configured to generate similar anomaly localization scores for the inputs with the similar fair features and independent of the unfair features;

inputting a new data to the anomaly detection model; and generating an anomaly score and an anomaly localization score associated with the new data based on the Gaussian distribution, the mean vector, and the precision matrix.

20. The system of claim 19, wherein the function is reduced using Stochastic Gradient Descent (SGD).

21. The system of claim 19, wherein the anomaly score is a negative log likelihood of the new data according to the Gaussian distribution of the historical data, the mean vector, and the precision matrix.

22. The system of claim 19, wherein the anomaly localization score is a negative log conditional likelihood of a feature of the new data.

23. A computer program product comprising one or more computer readable storage media, and program instructions collectively stored on the one or more computer readable storage media, the program instructions comprising instructions configured to cause one or more processors to perform a method comprising:

generating an anomaly detection model based on a Gaussian distribution of historical data, a mean vector of the Gaussian distribution, and a precision matrix of the Gaussian distribution, wherein the mean vector and the precision matrix are generated by reducing a function below a threshold, wherein the function includes the Gaussian distribution, a first regularization term configured to generate similar anomaly scores for inputs with similar fair features and independent of unfair features, and a second regularization term configured to generate similar anomaly localization scores for the inputs with the similar fair features and independent of the unfair features;

inputting a new data to the anomaly detection model; and generating an anomaly score and an anomaly localization score associated with the new data based on the Gaussian distribution, the mean vector, and the precision matrix.

24. The computer program product of claim 23, wherein the anomaly score is a negative log likelihood of the new data according to the Gaussian distribution of the historical data, the mean vector, and the precision matrix.

25. The computer program product of claim 23, wherein the anomaly localization score is a negative log conditional likelihood of a feature of the new data.

* * * * *